US012709915B2

(12) United States Patent
Buholzer et al.

(10) Patent No.: US 12,709,915 B2
(45) Date of Patent: Aug. 18, 2026

(54) KEY WITH LIGHT DEVICE FOR AN ELECTROMECHANICAL LOCKING DEVICE

(71) Applicant: dormakaba Schweiz AG, Kempten (CH)

(72) Inventors: Martin Buholzer, Wetzikon (CH); Stefan Greil, Wetzikon (CH); Alex Bruehwiler, Wetzikon (CH); Lukas Richter, Zürich (CH); Marcel Kölliker, Wetzikon (CH)

(73) Assignee: DORMAKABA SCHWEIZ AG, Kempten (CH)

( * ) Notice: Subject to any disclaimer, the term of this patent is extended or adjusted under 35 U.S.C. 154(b) by 0 days.

(21) Appl. No.: 18/470,146

(22) Filed: Sep. 19, 2023

(65) Prior Publication Data

US 2024/0318463 A1 Sep. 26, 2024

(30) Foreign Application Priority Data

Sep. 21, 2022 (EP) .................................... 22196941

(51) Int. Cl.
*E05B 35/00* (2006.01)
*E05B 19/00* (2006.01)

(52) U.S. Cl.
CPC ........ *E05B 35/001* (2013.01); *E05B 19/0088* (2013.01)

(58) Field of Classification Search
CPC .... E05B 35/00; E05B 35/001; E05B 19/0088; Y10T 70/7876; G07C 9/00944; G07C 2009/00404

(Continued)

(56) References Cited

U.S. PATENT DOCUMENTS 4,922,736 A * 5/1990 Tanaka .................. E05B 17/103 70/277
5,337,588 A * 8/1994 Chhatwal ........... G07C 9/00309 70/408

(Continued)

FOREIGN PATENT DOCUMENTS

CH 695624 A5 * 7/2006 ........... B60R 25/406
CN 110778214 A 2/2020

(Continued)

*Primary Examiner* — Suzanne L Barrett
(74) *Attorney, Agent, or Firm* — CANTOR COLBURN LLP

(57) ABSTRACT

A key for an electromechanical locking device, with a key bow, wherein the key bow includes a light device, and wherein the key bow has electronics configured to actuate the light device for reproducing at least one item of information in a luminous manner. The key is designed to enter into a wireless communication connection with a device, wherein the electronics are designed to display a search for the communication connection and/or an existing communication connection as information using the light device by actuating the same, wherein the key has an electrical energy storage device, wherein the electronics are designed to represent a charge status of the energy storage device as information by actuating the light device, wherein information about the energy storage device is represented in a different color than the information about the connection of the key to the device.

18 Claims, 8 Drawing Sheets

(58) Field of Classification Search
USPC ........................................................... 70/344
See application file for complete search history.

(56) References Cited

U.S. PATENT DOCUMENTS

| | | | | | |
|---|---|---|---|---|---|
| 8,511,122 | B1 * | 8/2013 | Mendoza | E05B 19/00 70/408 |
| 10,538,220 | B1 * | 1/2020 | Tyagi | B60R 25/245 |
| 2005/0237150 | A1 | 10/2005 | Sun et al. | |
| 2015/0159402 | A1 * | 6/2015 | Yahav | E05B 47/0615 70/344 |
| 2017/0092030 | A1 | 3/2017 | Badger, II | |

FOREIGN PATENT DOCUMENTS

| | | | |
|---|---|---|---|
| DE | 102006048369 | A1 | 4/2008 |
| DE | 102008015772 | B3 | 4/2009 |
| DE | 102012210357 | A1 | 12/2013 |
| DE | 102013008352 | A1 | 11/2014 |
| DE | 102017100284 | A1 | 7/2017 |
| EP | 0886024 | B1 | 8/2004 |
| EP | 1899924 | B1 | 8/2017 |
| EP | 3842607 | A1 * | 6/2021 |

* cited by examiner

A - A

B - B

C - C

KEY WITH LIGHT DEVICE FOR AN ELECTROMECHANICAL LOCKING DEVICE

CROSS-REFERENCE TO RELATED APPLICATIONS

This application claims the benefit of European patent application 22196941.3, filed on 21 Sep. 2022, the disclosure of which is incorporated herein by reference in its entirety.

TECHNICAL FIELD

The disclosure relates to a key with a light device for an electromechanical locking device.

BACKGROUND

EP 1 899 924 B1 shows a previously known key for an electromechanical locking device. The previously known key comprises a key bow on which electronics are arranged between two housing shells. A key shank extends from the key bow for insertion into a locking device. There is an electrical contact located on the key shank.

SUMMARY

The present disclosure indicates a key for an electromechanical locking device which provides technical information to the user. This is intended in particular to ensure comfortable and safe use.

This is achieved by providing the features of the independent claims. The dependent claims have preferred configurations of the disclosure as their subject matter.

The disclosure shows a key for an electromechanical locking device.

The electromechanical locking device is preferably a lock cylinder, in particular a double or half cylinder, a furniture cylinder or a padlock or a similar device. In particular, the locking device comprises a corresponding electronic device arranged in the locking device, which selectively locks and releases a rotation of a cylinder core and a driver in the locking device depending on an electrical signal transmitted by the key, in particular on transmitted electronic data. Alternatively, a mechanical coupling between the cylinder core and the driver can be made possible by the signal transmitted by the key, in particular by transmitted electronic data. The driver is preferably designed to be rotationally asymmetrical and enables a closing element, in particular a door, to be unlocked or locked when rotated. The electronic device preferably comprises a circuit board.

The locking device can comprise an electromechanical actuator, in particular an electric motor, which can unlock the cylinder core or couple it to the driver.

It can be provided that the key is designed without mechanical coding. That is to say that the transmitted electronic signal is sufficient to determine an access authorization.

The key according to the disclosure has a key bow. The key bow comprises electronics.

The key, in particular the key bow, preferably additionally comprises an electrical energy storage device. The energy storage device is designed in particular to power the electronics in the key. Additionally or alternatively, the energy storage device can be used to power the locking device.

According to the disclosure, the key, in particular the key bow, comprises a light device. Furthermore, it is provided that the electronics are designed to actuate the light device to reproduce at least one item of information in a luminous manner.

The electronics can in particular comprise an electronic controller. The electronic controller can comprise a processor. By means of the processor, the electronics can actuate the light device to reproduce at least one item of information in a luminous manner. The electronics can comprise a data memory.

The information can be a state of the key, for example. Furthermore, the information can relate to the locking device, in particular if the key is inserted into the locking device.

The information provides the user with technical information that enables them to handle the locking device and/or the key comfortably or safely. For example, it is displayed to the user that access is denied. The user will now not use brute force to gain entry, saving their time, key and/or locking device.

The light device in the key bow is designed in particular to light up in at least two colors, preferably at least three colors, particularly preferably at least four colors.

The light device particularly preferably comprises at least one light element. This light element is preferably an individual LED. The individual light element is in particular designed to emit at least two, preferably at least three, particularly preferably at least four, colors. For example, the light element is an RGB LED. This LED can basically light up in red, green or blue and mix the colors so that white light can also be generated, for example.

The electronics are designed in particular to represent different information about the key and/or about the locking device using different colors and/or using different flashing patterns and/or using different light intensities.

Different flashing patterns are understood to mean different interrupted or continuous light emissions, among others. For example, a long light emission is understood as a flashing pattern. For example, a plurality of, e.g. two or three, short, in particular regular, light emissions are understood as a flashing pattern.

Different colors, different flashing patterns or using different light intensities can also be collectively referred to as "patterns". It is preferably provided that the electronics are designed, by actuating the light device, to represent different information using different patterns. The respective "pattern" is characterized by the color, in particular exactly one color, and/or the flashing pattern, in particular exactly one regular flashing pattern. It may be that the respective pattern is also characterized by the light intensity. Two different patterns therefore differ in color and/or flashing pattern and/or possibly in light intensity.

It is preferably provided that the electronics are designed, by actuating the light device, to represent different information about the key using different patterns, i.e. using different colors and/or using different flashing patterns and/or using different light intensities.

Furthermore, it is preferably provided that the electronics are designed, by actuating the light device, to represent different information about the locking device using different patterns, i.e. using different colors and/or using different flashing patterns and/or using different light intensities.

It may be that the key, in particular the electronics, is designed, by actuating the light device, to represent at least one of the following items of information, preferably the following information, about the locking device by way of the key:

a) Existence of an access authorization b) Lack of an access authorization

The representation of the information "Existence of an access authorization" preferably differs at least in color from the representation of the information "Lack of an access authorization". Particularly preferably, the representation of the two items of information also differ in the flashing pattern.

It is preferably provided that the electronics comprise a wireless communication module for wirelessly sending and/or receiving signals. This wireless communication module allows the key to communicate with the device. In particular, this is a wireless communication module that is designed for near-field communication, for example via Bluetooth or ultra-wideband.

The device is in particular a mobile device, for example a smartphone, tablet or laptop. In addition, the device can also be a stationary installed device, such as a terminal that is used for door and/or building control.

The key can comprise at least one electrical transmission element in order to transmit electrical energy to the locking device and/or to transmit electronic data to the locking device and/or to receive electronic data from the locking device.

The electronics are preferably designed to communicate with the locking device in a wireless or wired manner. For this purpose, the key preferably has the at least one transmission element, which communicatively connects the electronics on the key side to the electronics device on the locking device side.

The transmission element can be used to send electronic data that makes it possible to determine an access authorization of a user for unlocking. For example, the transmission element can send an authorization code and/or an authorization time window, which is verified by the electronic device. Alternatively, the key can send an opening command to the locking device via the transmission element.

The communication can take place e.g. contact-based.

The key designed in this way allows the device to communicate with the locking device via the key. The communication can take place directly, with the key immediately relaying the information from the sender, i.e. the device or the locking device, to the receiver, i.e. the locking device or the device. Furthermore, indirect, time-delayed communication is possible, in which the key stores the information and relays it with a time delay.

The communication of the locking device via the key with the device can serve to send log data from the locking device to the device and/or to send authorization information for determining an access authorization, for example a blacklist, from the device to the locking device.

As described, the key is designed for a wireless communication connection with the device, in particular by way of the wireless communication module of the electronics. The electronics are preferably designed, by actuating the light device, to display a search for a communication connection and/or an existing communication connection by way of the light device, in particular the light element. This "search for a communication connection" or the "existence of a communication connection" thereby forms the information that is displayed via the light device. The "search for a communication connection" and the "existence of a communication connection" thereby preferably form different information that is represented differently by the light device. For example, different flashing patterns can be used for this purpose.

As described, the key can comprise the electrical energy storage device. The electronics are preferably designed, by actuating the light device, in particular by way of the light element, to represent a charge status of the energy storage device as information.

For example, the charge status of the energy storage device can be represented by the light device when the charge status falls below a limit value. The limit value can be stored in the electronics, e.g. in the electronic data storage device of the electronics.

The key preferably has a wired or wireless interface, for example a socket, for charging the energy storage device. The electronics are preferably designed, by actuating the light device, to represent as information a charging process and/or an end of the charging process by way of the light device, in particular the light element. Ending the charging process can be regarded as a "charged" state of the energy storage device. In this way, the key can be represented to be "charged" by the light device.

The charging process and the end of the charging process thereby preferably form different information that is represented differently by the light device. For example, different flashing patterns can be used for this purpose.

Particularly preferably, it is provided that the representation of the charging process and/or the "charged" state is limited to the time in which the interface is in connection with an external energy source. In particular, "charged" is only represented by the light device as long as the interface is connected to an external energy source, in particular a charging cable is inserted into the socket. If the key is separated from the external energy source, it can be provided that the display of the charge status is limited to the limit value not being met.

It may be that during the charging process, an increasing charge status is represented by a varying intensity, in particular an increasing intensity, by way of the light device.

Thus, at least one of the following items of information about the key, preferably the following information, can be represented by the light device:

c) information about the energy storage device, d) information about the connection of the key to the device.

In addition to the information about the locking device, namely a) the existence of an access authorization and b) the lack of an access authorization, at least one item of information about the key, namely information about the energy storage device (c) and/or information about the connection of the key to the device (d) can preferably be represented by the light device. At least one item of information about the energy storage device and one item of information about the connection of the key to the device can particularly preferably be represented by the light device.

The key, in particular the electronics, is preferably designed, by actuating the light device, to represent the information about the key, in particular the information about the energy storage device (c) and/or information about the connection of the key to the device (d), in a different color than the existence of an access authorization. Both the information about the energy storage device and the information about the connection of the key to the device are preferably represented in at least one different color than the existence of an access authorization.

The key, in particular the electronics, is preferably designed, by actuating the light device, to represent information about the key, in particular information about the energy storage device (c) and/or information about the connection of the key to the device (d), in a different color than the lack of an access authorization. Both the information about the energy storage device and the information about the connection of the key to the device are preferably represented in at least one different color than the lack of an access authorization.

The information about the energy storage device (c) is preferably represented in a different color than the information about the connection of the key to the device (d).

For example, the information about the energy storage device is represented in white, the information about the connection to the device in blue, the existence of the access authorization in green and the lack of the access authorization in red.

As already described, different information about the energy storage device, e.g. a charging process, being charged, falling below a limit value can be represented by the light device. The key, in particular the electronics, is preferably designed, by actuating the light device, to represent the different information about the energy storage device in only one color, e.g. white. Different information about the energy storage device, in particular all information about the energy storage device that can be represented by the key, form a group of information that each use the same color for representation. The different information about the energy storage device can be distinguished, despite using the same color, by using different flashing patterns.

The one color for representing different information about the energy storage device preferably differs from the color for representing the existence of an access authorization and/or the lack of an access authorization.

It can be provided, for example, that a color is intended exclusively for information about the energy storage device. That is to say that this color is only used for information about the energy storage device.

As already described, different information about the connection of the key to the device, e.g. “search for a communication connection” or the “existence of a communication connection” can be represented by the light device. The key, in particular the electronics, is preferably designed, by actuating the light device, to represent the different information about the connection to the device in only one color, e.g. blue. Thus, different information about the connection to the device, in particular all information about the connection of the key to the device that can be represented by the key, forms a group of information that each use the same color for representation. Despite using the same color, the different information about the connection to the device can be distinguished by using different flashing patterns. Preferably, the one color for representing different information about the connection of the key to the device differs from the color for representing the existence of an access authorization and/or the lack of an access authorization.

It can be provided, for example, that a color is provided exclusively for information about the communication of the key with the device. That is to say that this color is only used for information about the communication connection.

It can be provided that the one color for representing different information about the energy storage device differs from the one color for representing different information about the connection of the key to the device.

It may be that the information represented by the light device is additionally reproduced and/or supplemented on the screen of the device by a readable text and/or by an acoustic signal and/or vibration signal. Application software, i.e. an app, can be installed on the device, which is designed to reproduce more detailed information about the information represented by the light device as readable text and/or to actuate an acoustic and/or vibrating playback device of the device.

Furthermore, it is preferably provided that the electronics are designed, by actuating the light device, to represent as information at least one of the following errors by way of the light device, in particular the light element:

The error can be a faulty locking device. For example, the key can output a corresponding signal via the light device, which prompts the user to read on the device (e.g. smartphone) what the specific error is.

In a similar way, a faulty key, in particular disrupted communication with the device, can be displayed. The corresponding lighting-up of the light device can prompt the user to read on the device (e.g. smartphone) which specific error is involved.

For example, it can be provided that different errors are represented by the same pattern, in particular by the same color and the same flashing pattern, which is emitted by the light device. This means that the user is not overwhelmed by a large number of different patterns. Rather, a message about the error is sent to the device. Application software, i.e. an app, can be installed on the device and is designed to output more detailed information as readable text and/or images on a screen of the device.

The key, in particular the key bow, can comprise a button. The button can be used, for example, to wake up the electronics. In particular, it is provided that the electronics of the key are designed so that communication with the device, e.g. smartphone, begins when the button is actuated. In particular, the electronics send out a corresponding signal via the wireless communication module after the button is actuated in order to establish communication with the device.

It can be provided that pressing the button for different lengths of time leads to different communication with the device. For example, a long press on the button results in the key and/or the device being switched to an administration mode. However, a short press on the button can trigger communication in operating mode. The transition to different modes can be regarded as different communication between the key and the device and can be represented by the light device in particular by different flashing patterns, preferably in the same color.

The key preferably comprises a key shank. The key shank preferably extends from the key bow.

The key shank is designed to be inserted into the locking device. The key shank is designed in particular to transmit torque to the locking device into which the key can be inserted. In particular, the key and the locking device are designed such that a torque can be transmitted to the locking device for moving a driver, in particular a locking lug, by rotating the key. By rotating the driver, a closing element, in particular a building door, cabinet door, or the locking device itself can be unlocked or locked.

It may be that a prerequisite for the transmission of energy and/or data from the key to the locking device is that the key is inserted into the locking device. The energy storage device can be used to power the locking device as long as the key is inserted into the locking device. The electronics on the key side can be communicatively connected to an electronic device on the locking device side by means of the transmission element, as long as the key is inserted into the locking device. Direct communication between the device and the locking device may be limited to the time the key is inserted into the locking device.

Furthermore, it is preferably provided that the electronics are designed to actuate the light device, in particular the light element, after a trigger event, to reproduce the at least one item of information in a luminous manner. The trigger event is triggered in particular by the conscious action of a user.

The trigger event can thereby be at least one of the following events: pressing the described button of the key; and/or inserting the key into the locking device; and/or removing the key from the locking device; and/or connecting the interface to the energy source, in particular inserting a charging cable into the socket.

For example, after the button is pressed, a "search for a communication connection" or the "existence of a communication connection" to the device can be represented by the light device.

After inserting the key, it can e.g. be represented by the light device whether or not an access authorization exists.

Triggered by inserting and/or removing the key, can e.g. be represented by the light device in that the charge status of the energy storage device falls below the limit value.

It may be that communication with the device is established, triggered by the key being removed. A "search for a communication connection" or the "existence of a communication connection" to the device can be represented by the light device.

Connecting the interface to the energy source, in particular inserting a charging cable into the socket, can trigger the charge status and/or the charging process to be represented by the light device.

Furthermore, it is preferably provided that the electronics are designed, by actuating the light device, to represent different patterns—that is, different colors and/or different flashing patterns and/or different light intensities—triggered one after the other by a, in particular single, trigger event. In particular, different information about the key and/or the locking device can be thereby represented by the different patterns.

In particular, the different patterns are thereby represented one after the other by the same light element.

For example, it is preferably provided that the electronics are designed to actuate the light device to represent a charge status of the energy storage device after inserting the key into the locking device. In particular, the representation of the charge status is one item of information from a plurality of items of information that is represented after the key has been inserted. Another item of information, which is represented in particular by a trigger event, namely the insertion of the key, can e.g. be the existence of an access authorization or the lack of an access authorization.

Another way to represent different information after a trigger event, e.g. actuating the button or removing the key, is to represent a connection to the device being established and an error message one after the other. Likewise, the "search for a communication connection" and then the "existence of a communication connection" are two items of information that are represented one after the other by a trigger event, in particular by actuating the button. Likewise, the charging process and being charged are at least two items of information that are represented as a trigger event after connection to the interface.

It is preferably provided that at least two items of information, triggered one after the other by a trigger event, are represented and differ in at least the flashing pattern.

Furthermore, it is preferably provided that the electronics are designed so that inserting and/or removing the key shank into/out of the locking device causes the electronics to wake up the electronics and/or to establish communication with the device.

Furthermore, it is preferably provided that the key can be configured in such manner that at least a part of the information that can be represented by the light device is not, in particular permanently, represented by the light device. The configuration can be stored in the electronics. This makes it possible for example that certain information or its representation is deactivated for certain users or certain application purposes in order to save energy and not to overwhelm the user. In particular, the configuration can be set via the device and/or stored in the electronic data storage device of the key.

Furthermore, it is preferably provided that the electronics are designed to actuate the light device in order to represent contrasting information about mutually exclusive states using different patterns, with the patterns differing in particular in the flashing pattern and/or in the color. The representations of the contrasting information preferably differ at least in the flashing pattern, so that even color-blind people perceive the contrasting information differently. The representations of the contrasting information are particularly preferably distinguished by different flashing patterns and by different colors. For example, an access authorization can be represented by a long, green signal and denial of the access authorization by a short, red flashing.

The key, in particular the key bow, comprises a housing.

The housing preferably forms a receiving space. The housing preferably receives the electronics and/or the energy storage device in the receiving space. In particular, the housing tightly encloses the electronics and/or the energy storage device.

The housing preferably comprises a first housing part and a second housing part. The receiving space for the electronics and/or the energy storage device is formed in particular between the first and second housing parts.

The housing can be designed of plastic.

To further define the disclosure, the following imaginary axes and sides are preferably defined:

The key has a longitudinal axis. The longitudinal axis extends in particular along the key shank. Accordingly, the key is inserted into and removed from the locking device along the longitudinal axis. Furthermore, the key has a width axis and a thickness axis. The longitudinal axis, the width axis and the thickness axis are each perpendicular to one another.

Two broad sides are preferably defined on the key. The two broad sides are preferably opposite one another. The two broad sides are each intersected by the thickness axis. An end surface is particularly preferably located on at least one of the two broad sides. The end surface is in particular flat. One end surface is particularly preferably located on each of the two broad sides. One, preferably both, end surfaces are preferably perpendicular to the thickness axis.

Furthermore, the key bow preferably has two opposing narrow sides. The narrow sides are preferably perpendicular to the broad sides. Preferably, each narrow side is intersected by the width axis. The narrow sides are preferably each smaller than the broad sides.

Furthermore, it is preferably provided that the key shank extends along the longitudinal axis starting from a front side of the key bow. A rear side of the key bow is opposite this front side. In the region of the rear side there is preferably a key ring through-opening for attaching the key to a key ring. Preferably, the front side and the rear side are intersected by the longitudinal axis.

To actuate the button, the housing preferably has an actuating section. This actuating section can be pressed by the user. The actuating section is flexible in such manner that the actuating section can be pushed in to actuate the button. In particular, the user thereby presses the actuating section on one broad side and supports the key bow with an opposite finger or hand on the opposing broad side.

Furthermore, the key, in particular the key bow, preferably comprises a frame. The energy storage device and/or the electronics is/are located in this frame. The energy storage device and/or the electronics is/are thus received in the frame. For this purpose, a housing is used in particular, which will be described in detail later.

The frame is made in particular of metal or plastic, in particular fiber-reinforced plastic.

The frame preferably extends around the thickness axis or an axis parallel to the thickness axis. The frame is preferably in the form of a closed ring; with ring-shaped not limiting the geometric shape of the frame. In particular, the frame can be designed to be rectangular or oval.

The frame encloses a free space inside the frame—when viewed without electronics, energy storage device and housing. The free space is preferably open on both sides, in particular completely open. The electronics and/or the energy storage device, in particular with the housing, is arranged in this free space. As soon as the housing is mounted in the frame, the free space in the frame is filled by the housing.

The light device, in particular the light means, is preferably arranged within the free space.

The electronics can comprise a circuit board. The light device is preferably arranged on the circuit board.

It is preferably provided that at least one light guide is arranged in the housing of the key. Such a light guide consists, for example, of appropriate plastic or glass and directs the light, for example from the LED on the circuit board, to the outside so that it is visible to the user.

It is preferably provided that the light device, preferably the light element, lights up through the light guide towards the broad side of the key.

Furthermore, it is preferably provided that the light device, preferably the light element, lights up through the light guide beyond the frame in the direction of the key shank.

Furthermore, it is preferably provided that the light device, in particular the light element, is arranged within the free space described, which is enclosed by the frame; in particular, the light device is located on the circuit board of the key.

The light guide is preferably located at least partially in the actuating section described, which is designed to be flexible in such manner that it can be pushed in to actuate the button of the key.

The light guide described above is particularly preferably a first light guide and a second light guide is also provided. The two light guides can also be combined in one component, so that it is ultimately a first light guide section and a second light guide section. The first light guide is arranged for emission on the first broad side of the housing. The second light guide is arranged for emission on the second broad side of the housing.

In particular, it is provided that light can be emitted, in particular synchronously, from the light device through the first and second light guides. For this purpose, the light device can have a light element that feeds into both light guides. Alternatively, the light device can have two synchronously actuated light elements (for example two LEDs), with one light element feeding into each one of the two light guides. It can be provided that a separate light element is provided for each light guide.

Furthermore, it is preferably provided that the light intensity of the light device can be varied by the electronics depending on the time of day and/or the ambient lighting.

It can be provided that the key comprises a timer with which the current time can be determined. The time determined in this way can be used to adjust the light intensity of the light device.

Furthermore, it is preferably provided that the key shank is rigidly connected to the frame. In particular, the frame is composed of a first frame part and a second frame part. The key shank is preferably rigidly arranged on the first frame part.

In particular, this rigid arrangement means that the key shank is immovable relative to the frame. It is therefore preferably provided that the key shank cannot be folded in relative to the frame or removed from the frame. This enables a relatively stable torque transmission from the frame to the key shank and thus to the locking device.

Furthermore, it is preferably provided that the frame comprises at least one grip region which forms a top surface of the key bow for a user to grasp. This means that the user can directly grasp the frame—not just the housing—and thus transmit the required torque directly to the frame. In particular, the entire grip region has a top surface of the key bow for a user to grasp.

"Top surface" is thereby understood to mean, in particular, a region of the frame that is exposed and can therefore be touched by the fingers or hand of the user.

In particular, the frame has at least two opposing grip regions, each of which is spaced apart from the longitudinal axis, so that the torque can be transmitted using a corresponding lever. Particularly preferably, the key bow can be gripped such that the key bow is located between two of the fingers of the user and the two fingers thereby each rest on one of the two opposing grip regions.

It is particularly preferably provided that the frame is formed circumferentially on the top surface of the key bow. In this case, the frame is preferably completely circumferential, that is to say in the form of a closed ring, and is located along the entire circumference on the top surface of the key bow.

It is preferably provided that—when viewed along the width axis (i.e. when viewed from the narrow side)—the at least one grip region extends over the entire length of the key bow, which is defined parallel to the longitudinal axis. As a result, the grip region preferably extends from the front side to the rear side of the key bow.

Only the top surface that is spaced apart from the longitudinal axis is preferably regarded as the grip region of the frame, so that torque can be transmitted over the entire grip region. Particularly preferably, the at least one grip region is a section of the frame which itself or its tangent runs parallel or not at 90° to the longitudinal axis. Particularly preferably, the at least one grip region comprises the furthest point of the key from the longitudinal axis. Furthermore, it is preferably provided that the at least one grip region does not intersect the longitudinal axis. As described, it is preferably provided that the frame comprises opposing grip regions. Both grip regions preferably intersect a plane perpendicular to the thickness axis.

Furthermore, it is preferably provided that the frame is designed to be substantially rectangular or oval. In the case of the rectangular shape, parallel sides of the rectangular shape are preferably parallel and spaced apart from the longitudinal axis. These two sides form the two opposing grip regions.

Furthermore, it is preferably provided that the frame has a frame thickness of at least 3 mm, in particular at least 5 mm, parallel to the thickness axis. This provides a sufficient area that the user can grasp, in particular grip.

As described, the frame is preferably composed of a first frame part and a second frame part. As a result, the electronics and/or the energy storage device, in particular together with the housing, can be inserted into the frame in an easy-to-assemble manner.

It is preferably provided that the first and the second frame part are connected in a force-fitting and/or form-fitting manner at at least one connection point. In particular, at least two opposing connection points are provided. Particularly preferably, at least one locking lug, which locks into a corresponding counter locking point, is located at each connection point.

The at least one connection point, preferably the at least two connection points, is/are preferably spaced apart from the longitudinal axis. In particular, there is a connection point in each grip region.

Furthermore, it is preferably provided that the at least one connection point, in particular the two connection points, is/are located in the front half of the key bow facing the key shank.

The key shank preferably comprises a key shank main body. The frame, in particular the first frame part, is preferably connected in one piece to the key shank main body. The frame, in particular the first frame part, is particularly preferably manufactured monolithically with the key shank main body. This monolithic production means in particular that the frame, in particular the first frame part, and the key shank main body are originally formed together; for example, cast from metal or injection molded from plastic.

The key shank main body preferably extends over at least half the length of the key shank; particularly preferably over the entire length of the key shank. This ensures that a significant part of the key shank main body can be inserted into the locking device and the torque can be safely transmitted. The length of the key shank is defined coaxially or parallel to the longitudinal axis.

Preferably, the first frame part and the key shank main body are designed to be fork-shaped together. This describes in particular that the first frame part comprises a front section from which two parallel front legs extend. The front section is preferably perpendicular to the longitudinal axis by itself or with a tangent. The two front legs are in particular spaced apart from the longitudinal axis. In particular, the two front legs each form part of the two opposing grip regions. The key shank main body preferably extends centrally between the two front legs from the front section of the first frame part. The key shank main body thereby extends in one direction and the two front legs in the opposite direction.

Preferably the housing is surrounded by the frame. In particular, the housing is received in the frame and thus fastened in the frame. Particularly preferably, the frame encloses the housing over its entire circumference—with the exception of any key ring through-opening that can be formed between the housing and the frame.

The housing receives the electronics and/or the energy storage device. The receiving space for the electronics and/or the energy storage device is formed in particular between the first and second housing parts.

The housing preferably forms a top surface of the key bow on each of the two opposing broad sides—that is, a surface that can be touched by the user.

It is preferably provided that the housing protrudes beyond the frame along the thickness axis at least on one side, preferably on both sides. It is preferably provided that the frame protrudes beyond the housing along the longitudinal axis and/or along the width axis.

The frame, in particular each frame part, preferably comprises at least one rail. The respective rail is designed in particular to arrange the first housing part and the second housing part on one another.

In particular, there are parallel rails located in the frame, with each housing part having an associated rail holder. By pushing the frame-side rails and the housing-side rail holders into one another, the two housing parts can be arranged and fixed relative to one another and relative to the frame. The rail holder can be designed as a groove and the rail as a complementary projection that fits into the groove (also: protrusion). In the same way, in the reverse version, the rail can be designed as a groove and the rail holder can be designed as a complementary projection that fits into the groove (also: protrusion).

A seal is particularly preferably arranged between the two housing parts. In particular, the rails in the frame are designed so as to press the two housing parts towards one another and thereby compress the seal.

Furthermore, it is preferably provided that the first housing part forms a top surface of the key bow on the first broad side and the second housing part on the opposing second broad side.

It is preferably provided that the key shank has at least one transmission element for the transmission of electrical energy (also: power) and/or electronic data to the locking device. This at least one transmission element is, for example, a metal sheet, a wire or a printed circuit board.

Particularly preferably, at least two of the transmission elements are provided, with the transmission elements being arranged symmetrically so that the key can be used like a reversible key. In addition, the geometry of the key shank is preferably chosen so that the key can be used as a reversible key. In particular, for the reversible key-like usability, it is provided that the key shank is designed symmetrically in relation to a plane in which the longitudinal axis lies.

The at least one transmission element preferably extends from the electronics into the key shank. Inside the key bow, the transmission element preferably has a circuit board contact surface. At this circuit board contact surface, the transmission element can be connected to a circuit board of the electronics in an electrically conductive manner. In the region of the key shank, the transmission element preferably has a locking device contact surface which is exposed and—when the key is inserted into the locking device—can be connected to the electronic device on the locking device side in an electrically conductive manner.

The key shank preferably comprises an insert element. This insert element is preferably made of plastic.

The insert element is preferably arranged on at least one of the two housing parts, preferably on both housing parts. For example, one of the two housing parts has a receiving groove into which the insert part can be inserted. This receiving groove is covered by the other housing part, so that the insert element is arranged, in particular clamped, between the two housing parts.

It is preferably provided that the insert element is fastened to the key shank main body, in particular in a force-fitting and/or form-fitting manner. A tongue-and-groove connection is particularly preferably provided between the insert element and the key shank main body.

The key shank main body particularly preferably has parallel shank legs that are spaced apart from one another. The insert element can be inserted between these two shank legs. In particular, the insert element is connected to at least one of the two shank legs via the tongue-and-groove connection. At the front end of the key shank, the two shank legs can be connected to one another via a shank leg connection. The insert element does not thereby have to extend to the front end of the key shank main body.

In the frame, in particular in the front section of the first frame part, there is preferably an insert element through-opening through which the insert element can be inserted into the key shank from the inside of the frame to the outside.

The insert element preferably comprises the at least one transmission element. In particular, the at least one transmission element is embedded in the insert element.

The key preferably comprises the socket, in particular designed as a USB-C connection. The socket is designed to charge the energy storage device and/or to connect the cable to the electronics. The socket is particularly preferably arranged on the circuit board.

The frame, in particular the second frame part, preferably has a frame socket opening. The socket for a corresponding plug is accessible through this frame socket opening. The socket itself need not extend into the frame socket opening. Rather, it is preferably provided that the socket does not extend into the frame socket opening, but is merely arranged in the housing.

One of the two housing parts preferably has an enclosing housing socket opening for the socket. This enclosing housing socket opening is preferably closed over its entire circumference, so that the socket is surrounded over its entire circumference by only one of the two housing parts. As a result, the sealing of the two housing parts or the sealing towards the socket is designed to be simple.

Particularly preferably, the key bow only comprises a single button. The button is preferably located on the circuit board and therefore inside the housing described. In particular, only a single button is provided, so that the user does not have the choice between a plurality of buttons, but can only press this one button.

In addition to the actuating section, the housing preferably comprises a support section. In particular, any region of the housing that is not an actuating section—i.e. cannot be flexibly pressed against the button by the user—is the "support section" of the housing.

Furthermore, it is preferably provided that the button can be actuated by pressing the first and second housing parts against one another. In particular, the two opposing broad sides of the key bow are thereby pressed against one another.

It is preferably provided that the actuating section and the support section are formed in one piece with one another. Particularly preferably, this is a monolithic design of the actuating section and support section, preferably as an injection molded part, particularly preferably as a one-component injection molded part. Particularly preferably, the first housing part comprises the actuating section, which is surrounded by the support section. For this purpose, the first housing part is designed in particular to be monolithic.

As already described, the housing preferably forms an end surface, in particular a flat end surface, of the key bow on at least one broad side. The actuating section preferably lies in this end surface. A part of the end surface can also be formed by the support section. The end surface is preferably surrounded, in particular surrounded over its entire circumference, by an edge section of the first housing part. This edge section has in particular the rail holder described, which represents the connection to the frame.

It is preferably provided that the actuating section covers at least 20%, preferably at least 25%, particularly preferably at least 30% of the extension of the broad side. This is the broad side on which the actuating section is arranged, i.e. the broad side that can be pushed in to press the button. Additionally or alternatively, it is preferably provided that the actuating section comprises at least 30%, preferably at least 40%, particularly preferably at least 50%, of the extension of the end surface described. "Extension" is to be understood in particular as the projected area perpendicular to the thickness axis, with either the area of the entire key bow or the area of the end surface being decisive here.

It is preferably provided that the actuating section merges into the support section within the end surface described.

Particularly preferably, the actuating section and the support section, in particular in the region of the end surface, differ at least partially in an internal wall thickness of the housing. The transition from one wall thickness to another wall thickness can occur abruptly at a step, or the wall thickness can change continuously or in a plurality of steps.

The transition from one wall thickness to the other wall thickness does not necessarily have to be at the transition from the actuating section to the support section. It is important that the changing wall thickness enables a correspondingly flexible design of the housing, so that the actuating section can be easily pressed inwards in the direction of the button. In particular, the change in wall thickness is "internal", so that the outer top surface of the key bow has a flat end surface and the difference in wall thickness is not visible.

Furthermore, it is preferably provided that the, in particular one-piece, support section forms the housing on the narrow side of the key bow. Thus, if the key is viewed along the longitudinal axis or along the width axis (i.e. when viewing the front, back or narrow side), in particular the frame section and thus at least a part of the support section of the housing can be seen—partially hidden by the surrounding frame.

The housing preferably has a support column to limit a travel when the actuating section is actuated. This support column prevents the actuating section from being pressed too hard on the button. The support column is formed in particular by a first support column part and a separately formed second support column part. These two support column parts meet when the actuating section is pressed. In particular, the first support column part is located on the first housing part and the second support column part is located on the second housing part. Preferably, the actuating section is formed in one piece, in particular monolithically, with one of the support column parts.

The circuit board preferably has a column recess. This can be a hole or a groove. The support column, for example at least one of the two support column parts, protrudes through this column recess. As a result, the support column can be arranged relatively close to the button to be protected.

The disclosure also comprises an arrangement. The arrangement comprises the key described and the electromechanical locking device described. In particular, the locking device comprises a corresponding electronic device arranged in the locking device, which selectively locks and releases a rotation of the key in the locking device depending on an electrical signal transmitted by the key.

The key is designed in particular to be able to be inserted into the locking device with its key shank and to transmit a torque to the locking device. Furthermore, it is thereby preferably provided that the at least one transmission element is designed to transmit power and/or data to the locking device.

Furthermore, the arrangement can comprise the device described, with the wireless communication module of the electronics of the key being designed to exchange data with the device.

BRIEF DESCRIPTION OF THE DRAWINGS

The disclosure will now be explained further on the basis of an exemplary embodiment, in which the following is shown.

DETAILED DESCRIPTION OF THE DRAWINGS

The design of a key 1 according to an exemplary embodiment is explained in detail below on the basis of FIGS. 1 to 10. Unless otherwise stated, reference is thereby always made to all figures.

Figure 1:
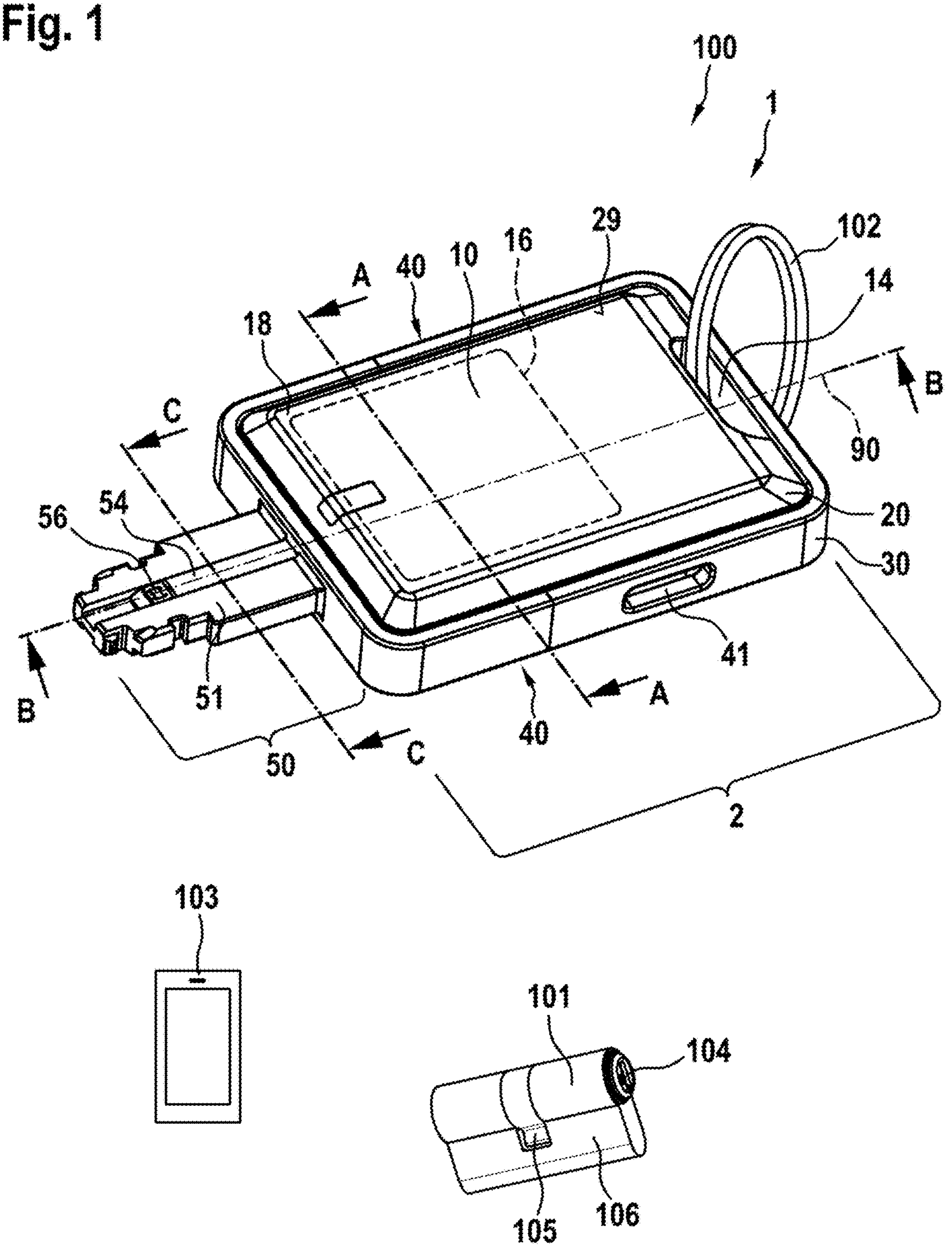
FIG. 1 a schematic view of an arrangement according to the disclosure with a locking device, device and key according to the disclosure in accordance with an exemplary embodiment, FIG. 2 an exploded representation of the key according to the disclosure in accordance with the exemplary embodiment, FIG. 3 a view of a narrow side of the key according to the disclosure in accordance with the exemplary embodiment, FIG. 4 a view of a broad side of the key according to the disclosure in accordance with the exemplary embodiment, FIG. 5 the section A-A marked in FIG. 1, FIG. 6 the section B-B marked in FIG. 1, FIG. 7 the section C-C marked in FIG. 1, FIG. 8 a detail of the key according to the disclosure in accordance with the exemplary embodiment, FIG. 9 electronics and a light device of the key according to the disclosure in accordance with the exemplary embodiment, FIG. 10 a state during the assembly of the key according to the disclosure in accordance with the exemplary embodiment, FIG. 11 an assembly method according to the disclosure, and FIG. 12 different light patterns for the key according to the disclosure in accordance with the exemplary embodiment.

FIG. 1 shows the key 1 in an isometric view together with a locking device 101 and a device 103. The key 1 with the locking device 101 forms an arrangement 100. The device 103 can also be part of this arrangement 100. In addition, a key ring 102 can be arranged on the key 1.

The locking device 101 is a lock cylinder with a corresponding electronic device, as explained in the general part of the description. The device 103 is a mobile device or a stationary terminal, also as defined in the general part of the description.

The key 1 comprises a key bow 2 and a key shank 50. The key shank 50 is used to insert into the locking device 101. If there is an electronic access authorization, the key 1 can rotate a cylinder core 104. If, on the other hand, there is no electronic access authorization, the cylinder core 104 cannot be rotated in a locking device housing 106. Here, a locking element, not represented, of the locking device 101 is prevented from leaving a connecting position between the cylinder core 104 and the locking device housing 106 by an electromechanical actuator, not represented, of the locking device 101. This means that the key 1 cannot be rotated in the locking device 101. Thus, a rotation of the key 1 in the locking device 101 is locked.

If there is an electronic access authorization, a driver 105, which is designed as a locking lug, can be rotated with the cylinder core 104. For this purpose, the electromechanical actuator has been operated, which enables the locking element to be withdrawn from the connecting position. A building door can be unlocked via the driver 105.

The key 1 comprises a key bow 2 and a key shank 50. The key shank 50 is used to insert into the locking device 101. The key bow 2 is formed by a housing 10 and a frame 30. The frame forms a free space 44 open on both sides (see FIG. 10) for arranging the housing 10. As soon as the housing 10 is mounted in the frame, the free space 44 in the frame 30 is filled by the housing 10.

Figure 3:
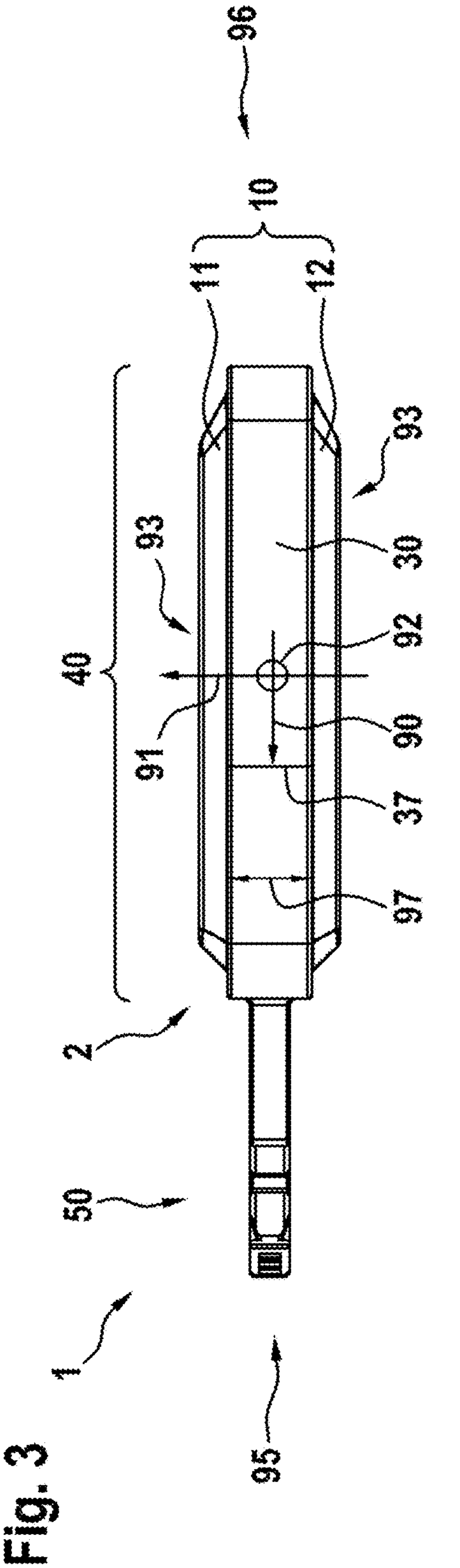
Figure 4:
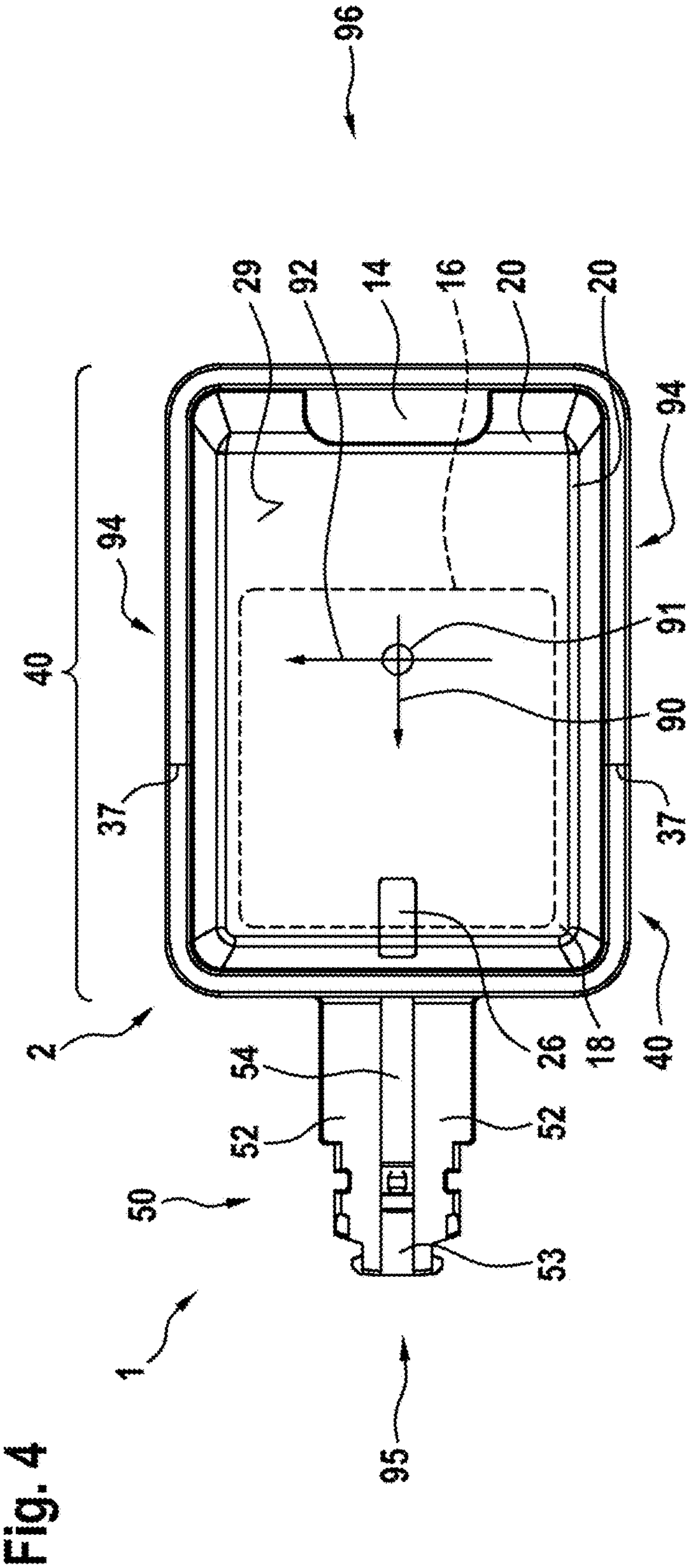

To define the disclosure, axes and sides are used, which are in particular illustrated in FIGS. 3 and 4. Accordingly, the key shank 50 extends along a longitudinal axis 90. A thickness axis 91 and a width axis 92 are perpendicular to the longitudinal axis 90. The key bow 2 has two opposing broad sides 93. These two broad sides 93 are intersected by the thickness axis 91. Furthermore, the key bow 2 has two opposing narrow sides 94. The narrow sides 94 are intersected by the width axis 92.

The key shank 50 is located on a front side 95 of the key bow 2. A rear side 96 is opposite this front side 95. A key ring through-opening 14 for the key ring 102 can be located on this rear side 96. The front side 95 and the rear side 96 are intersected by the longitudinal axis 90.

A frame thickness 97 of the frame 30 is defined parallel to the thickness axis 91. In the exemplary embodiment shown, the frame 30 constantly has this frame thickness 97 at every point.

Furthermore, the representation in FIG. 3 shows that the housing 10 projects beyond the frame 30 on both sides, i.e. on both broad sides 93, when viewed along the longitudinal axis 90 or the width axis 92.

The top view in FIG. 4 shows a view along the thickness axis 91. It can be seen that the frame 30 protrudes beyond the housing 10 along the longitudinal axis 90 and along the width axis 92—i.e. over its entire circumference. The frame 30 is thus formed circumferentially on the top surface of the key bow 2. Here, the frame 30 is designed to be open in the direction of the thickness axis 91. The broad sides 93 of the key bow 2, more precisely, the top surfaces of the broad sides 93, are thus formed by the housing 10 and the frame 30.

In the key bow 2, inside the housing 10 and thus surrounded by the frame 30, there is located electronics 70 of the key 1. The electronics 70 have the circuit board 71, which is represented in detail in FIG. 9.

Figure 9:
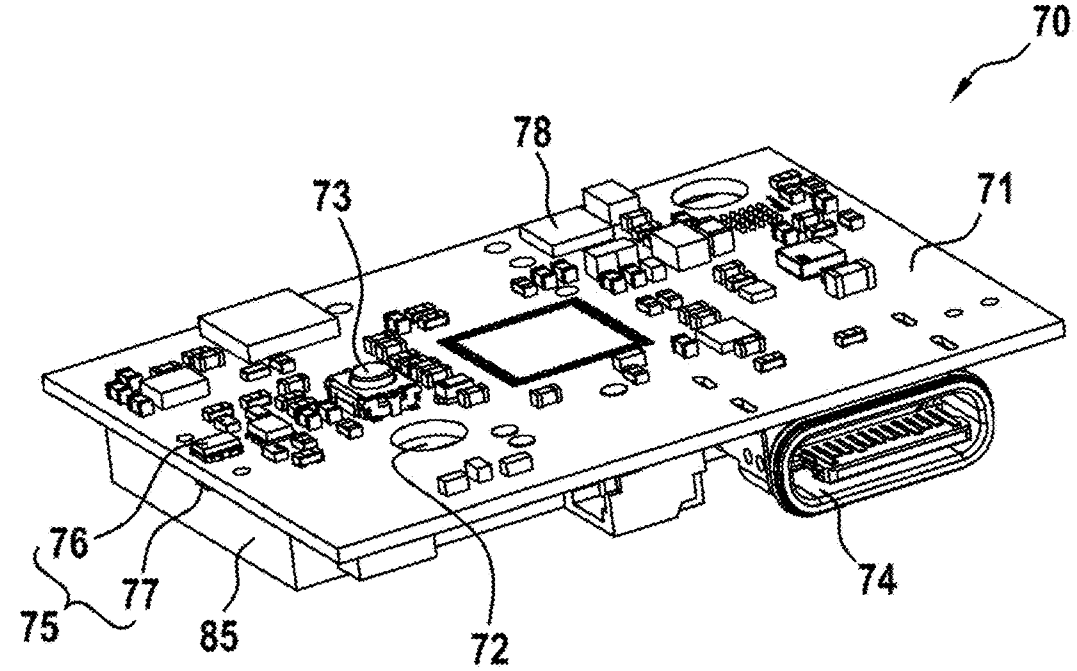

As represented in FIG. 9, a light device 75 is arranged on the circuit board 71. The light device 75 is therefore located in the free space 44.

Figure 12:
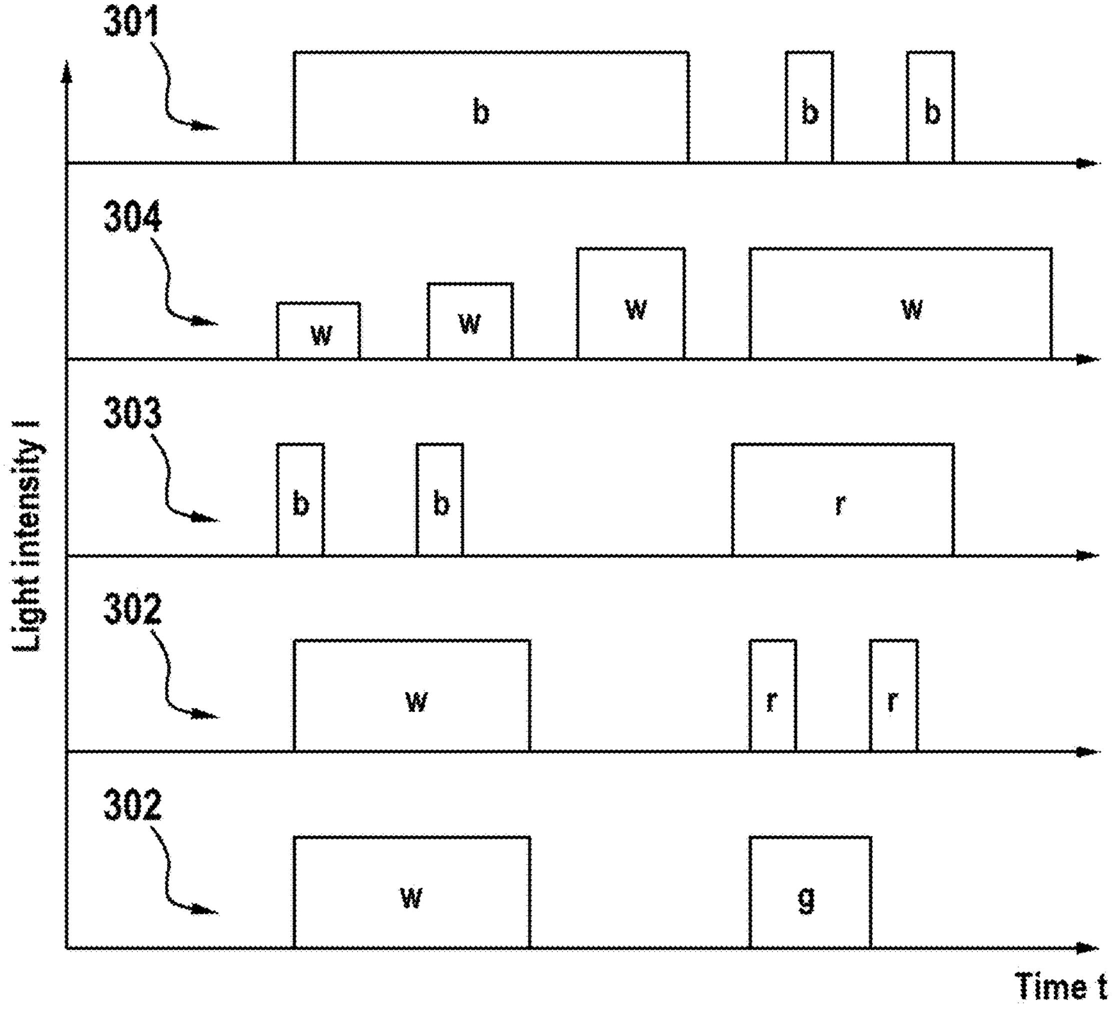

According to the disclosure, it is provided that the electronics actuate the light device 75 in such manner that the light device reproduces at least one item of information. In the exemplary embodiment shown here, a plurality of items of information are reproduced by the light device 75 using different colors, flashing patterns and light intensities. Exemplary information reproductions are represented in FIG. 12 and are explained further below in connection with FIG. 12.

In the exemplary embodiment shown, the light device 75 comprises a first light element 76 in the form of an LED on one side of the circuit board 71 and a second light element 77 in the form of an LED on the opposing side of the circuit board 71. The first light element 76 is arranged to feed light into a first light guide 26. The second light element 77 is arranged to feed light into a second light guide 27. The electronics 70 are designed to actuate the two light elements 76, 77 to reproduce at least one item of information in a luminous manner. In particular, the two light elements are actuated synchronously so that they both emit the same pattern.

The two light elements 76, 77 are in particular LEDs that can light up in a plurality of colors. The light elements 76, 77 are designed in particular as RGB LEDs. Thus, the light elements 76, 77 can emit light of at least four colors, e.g. through color mixing. In the present exemplary embodiment, information is represented by the emission of the colors white (w), blue (b), green (g) and red (r) (see also FIG. 12).

Furthermore, the housing 10 comprises the first light guide 26 on one broad side 93 and the second light guide 27 on the opposing broad side 93. The two light guides 26, 27 are each arranged to emit light on the associated broad side 93 and beyond the frame 30 in the direction of the key shank 50. If the light elements 76, 77 are actuated synchronously, the same pattern is emitted synchronously through the two light guides 26, 27. A user thus has the opportunity to perceive at least the light on at least one broad side 93 and thereby obtain the desired information.

The light guides 26, 27 can be produced with the rest of the housing 10, for example, using a two-component injection molding process.

The housing 10 is composed of a first housing part 11 and a second housing part 12. Each housing part 11, 12 has a rail holder 13 in each case. Corresponding rails 43 of the frame 30 are inserted into this rail holder 13 in order to arrange the two housing parts 11, 12 together and to seal the housing tightly.

In the housing 10, in particular in the second housing part 12, there is located a housing socket opening 15 for a socket 74.

Figure 5:
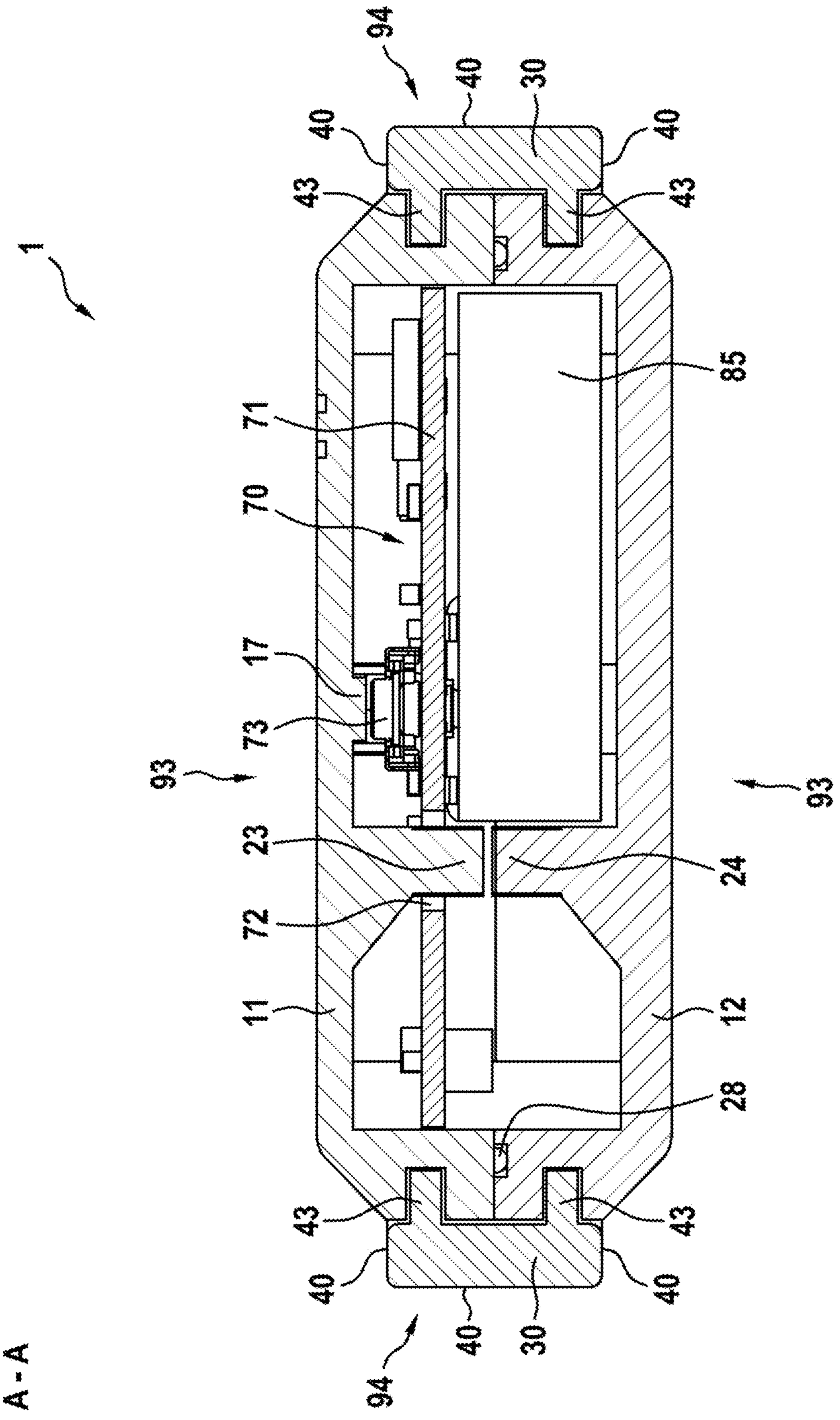

For example, the section A-A in FIG. 5 shows a button projection 17 on the inside of the first housing part 11. This button projection 17 can be pressed on an associated button 73. For this purpose, the user presses the two housing parts 11, 12 against each other.

The key bow 2 has a relatively large actuating section 16, which is designed to be flexible in such manner that it can be pushed in by the user to actuate the button 73. The user does not thereby have to look for a specific, small place on the key bow 2 in order to actuate the button 73, but can press on the relatively large actuating section 16.

For example, the views in FIG. 1 and FIG. 4 illustrate that a relatively large area of the first housing part 11 is designed as an actuating section 16. This actuating section 16 is surrounded all around by a support section 18. Any region of the first housing part 11 that does not form the actuating section 16 is assigned to this support section 18.

The light guide 26 of the first housing part 11 is arranged in the actuating section 16.

In particular, the first housing part 11 has a flat end surface 29 on one of the two broad sides 93. This flat end surface 29 is largely formed by the actuating section 16. At least a rear part of the flat end surface 29 is designed as a support section 18. In addition, the first housing part 11 comprises an edge section 20 which extends all around the flat end surface 29. This edge section 20 is also part of the support section 18.

Figure 6:
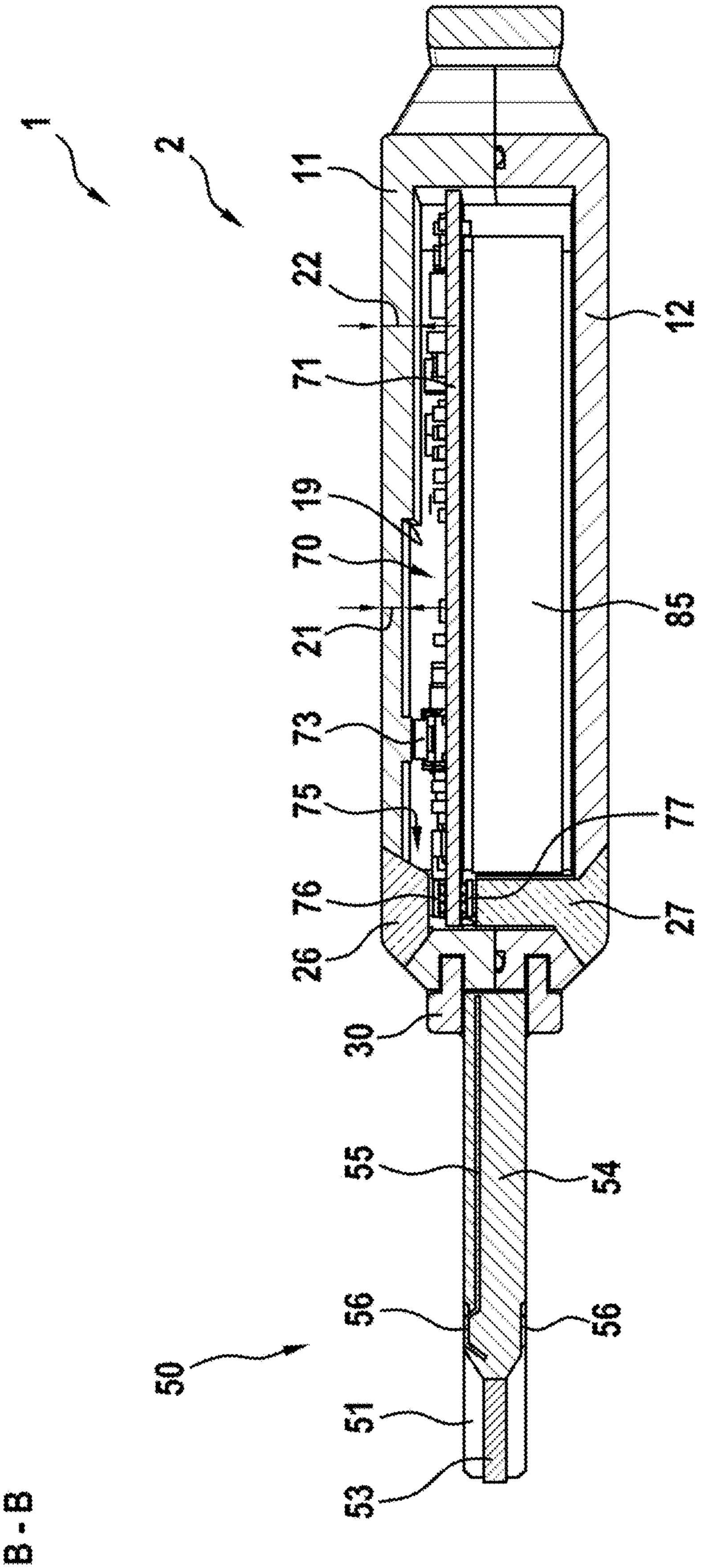

In order to achieve a correspondingly flexible design of the actuating section 16, the flat end surface 29 can have different wall thicknesses. In particular, the representation in FIG. 6 shows that in the region of the end surface 29, a first thin wall thickness 21 and a second thicker wall thickness 22 are provided. In the exemplary embodiment shown, the two wall thicknesses 21, 22 merge into one another with a step 19. Alternatively, a plurality of steps or a continuous change in the wall thickness can also be provided here.

In order that the two housing parts 11, 12 cannot be pressed too far or too hard against one another, a support column is provided, which is formed from a first support column part 23 and the inside of the first housing part 11 and a second support column part 24 on the inside of the second housing part 12. When the actuating section 16 is pushed in, the two support column parts 23, 24 meet to form the support column.

Figure 8:
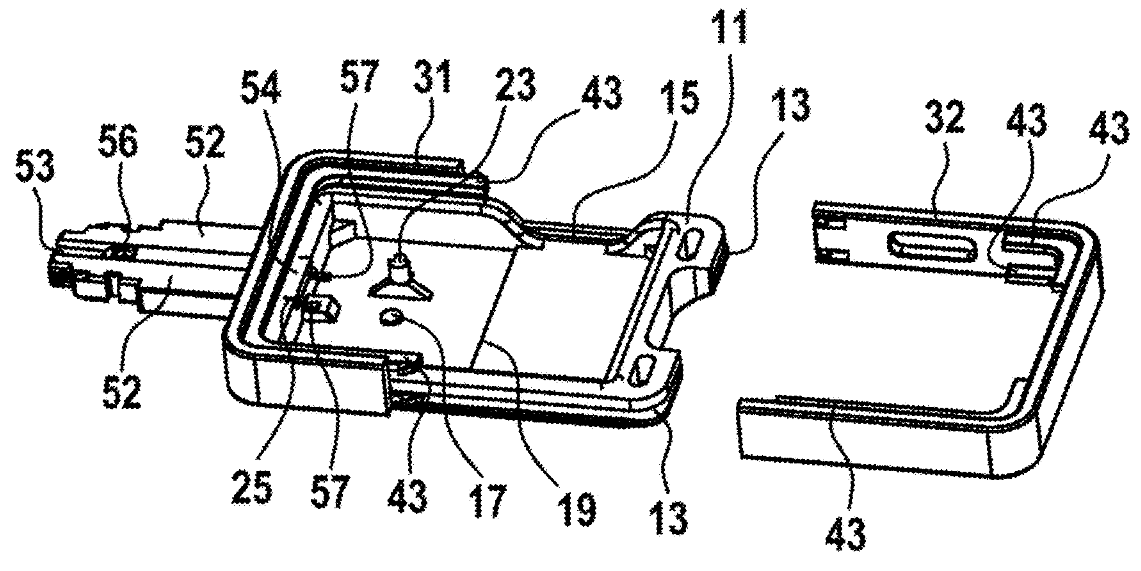

For example, FIG. 8 shows that the first housing part 11 has a receiving groove 25 for inserting an insert element 54. This makes it possible to arrange the insert element 54 on the housing 10.

Figure 2:
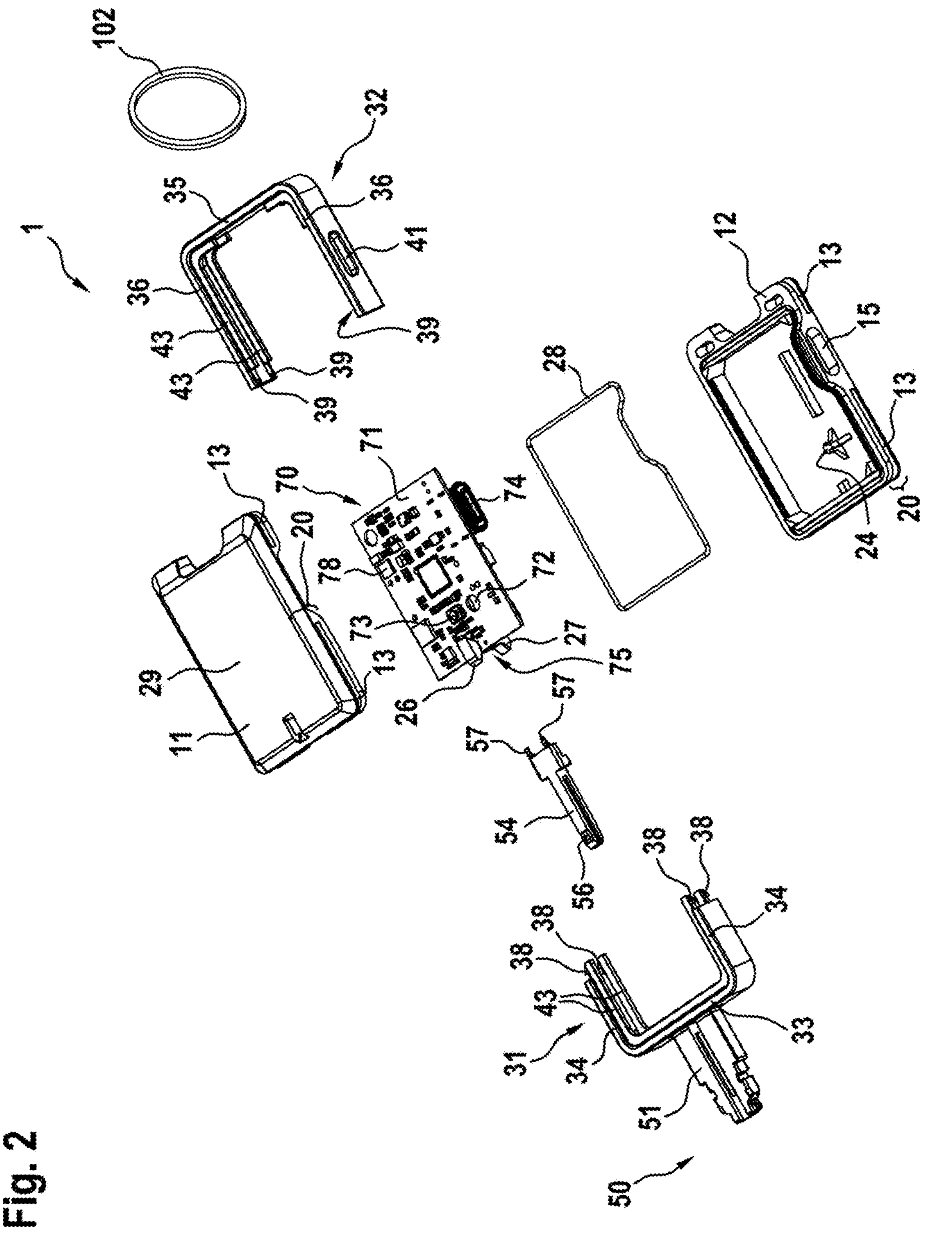

The exploded representation in FIG. 2 shows that a seal 28 can be inserted between the two housing parts 11, 12. Alternatively, this seal 28 can also be part of one of the two housing parts 11, 12, for example by way of a two-component injection molding process.

The frame 30 of the key bow 2 is formed by a first frame part 31 and a second frame part 32.

The first frame part 31 has a front section 33. The key shank 50, in particular a key shank main body 51, is located on this front section 33. This key shank main body 51 is formed monolithically together with the first frame part 31, for example cast together from metal. The key shank 50 and the frame 30 are therefore rigidly connected to one another.

Two front legs 34 of the first frame part 31 extend from the front section 33 in the direction of the rear side 96. As a result, the first frame part 31 is formed in the shape of a fork together with the key shank main body 51.

The second frame part 32 is designed to be U-shaped and thereby comprises a rear section 35 parallel to the front section 33. Two parallel rear legs 36 extend from this rear section 35 in the direction of the front side 95.

The two frame parts 31, 32 are connected to one another via two connection points 37. Each connection point 37 has two locking lugs 38 and two associated counter locking points 39. Through these connection points 37, the two frame parts 31, 32 are connected to one another in a form-fitting and force-fitting manner.

The frame 30, in the exemplary embodiment shown the second frame part 32, has a frame socket opening 41 through which the socket 74 is accessible.

The frame 30 has a grip region 40 on each of the two narrow sides 94. The two grip regions 40 each form a top surface of the key bow 2, which can be gripped by the user in order to rotate the key 1 in the locking device 101. The torque can be transmitted directly to the key shank 50 through the grip regions 40, which are located directly on the frame 30. There are no undesirable strains on the housing 10.

In the exemplary embodiment shown, the two grip regions 40 extend parallel and spaced apart from the longitudinal axis 90. In particular, the two grip regions 40 are formed by the two front legs 34 and the two rear legs 36.

The two grip regions 40 extend over the entire length of the key bow 2.

As already described, the key shank 50 comprises the key shank main body 51, which is a monolithic component of the first frame part 31. This key shank main body 51 has two shank legs 52 spaced apart from one another and a shank leg connection 53. The shank leg connection 53 connects the two shank legs 52 to one another at the front end of the key 1.

Figure 7:
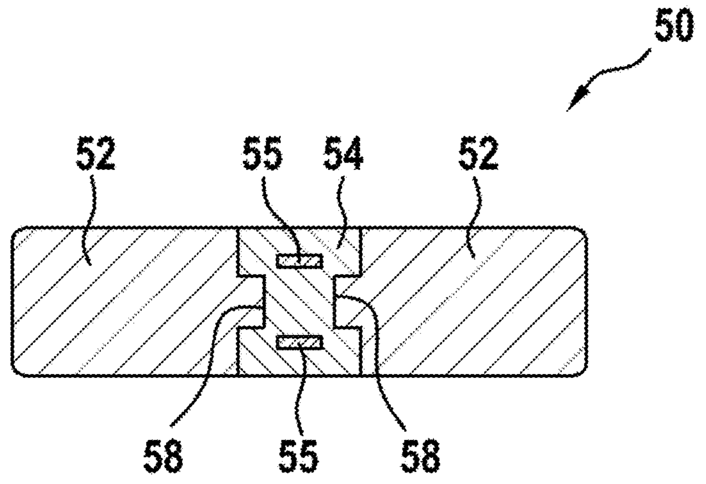

Furthermore, the key shank 50 comprises the insert element 54, in particular made of plastic. This insert element 54 is inserted between the two shank legs 52. In particular, the sectional representation C-C in FIG. 7 illustrates that the insert element 54 is located between the two shank legs 52 and is connected to both shank legs 52 via a tongue-and-groove connection 58.

At least two transmission elements 55 extend inside the insert element 54. Since the key 1 is designed as a reversible key, at least two of these transmission elements 55 are provided. The transmission elements 55 serve to transmit electrical energy and electronic data to the locking device. The electronic data is used to determine an access authorization or comprises an opening command, which actuates the actuator in order to enable the locking element to be withdrawn.

In the region of the key shank 50, the two transmission elements 55 each have a locking device contact surface 56. The respective locking device contact surface 56 is exposed on the top surface of the key shank 50 and can therefore be used for data and/or energy transmission to the locking device 101.

Inside the key bow 2, the transmission elements 55 each have a circuit board contact surface 57 in order to connect the two transmission elements 55 to the circuit board 71 in an electrically conductive manner.

On the circuit board 71 there is located the button 73 already described, which can be pressed by the actuating section 16, in particular via the button projection 17.

Furthermore, the socket 74 is located on the circuit board 71, here designed as a USB-C socket.

A column recess 72 is located relatively close to the button 73, here as a hole. The support column, formed by the two support column parts 23, 24, protrudes through this column recess 72.

On the circuit board 71 there is located a wireless communication module 78, designed for near-field communication with the device 103.

FIG. 9 further illustrates that an energy storage device 85 for powering the electronics 70 and/or the locking device 101 is arranged inside the key bow 2. This energy storage device 85 can be charged via the socket 74, for example.

The button 73 must be actuated in order to communicate with the device 103 via near-field communication. If the button 73 has not been pressed shortly beforehand, the wireless communication module 78 is asleep, such that electrical energy from the energy storage device 85 can be saved.

FIG. 12 shows an example of patterns in terms of light color, intensity and flashing pattern for different trigger events. The patterns reflect different information.

At least one group of information preferably has its own color here. For example, the color blue is used, in particular exclusively, to represent information regarding communication with the device 103. Different flashing patterns can represent different information regarding communication with the device here: For example, a long blue light indicates that a connection is being established, i.e. a search for the communication connection, while a short blue flashing multiple times indicates the existing communication connection. The search for the communication connection can be e.g. pairing. In particular, the color "white" is used exclusively to represent information regarding the charge status of the energy storage device 85. The color "green" is only used to indicate an access authorization. On the other hand, "red" is used for both an error display and a lack of an access authorization and thus for a plurality of groups of information.

The light intensity I over time t is represented in FIG. 12. Each of the five patterns represented one above the other begins with a single trigger event, in particular at time 0. The trigger event arises from a conscious action by a user.

Accordingly, in the top time bar represented, when pressing 301 the button 73 as a trigger event, blue light (b) with two successive patterns can be emitted. Each pattern comprises a different flashing pattern. The first flashing pattern "long" provides the information that a connection to the device 103 is being established. The second flashing pattern "short" "short" represents that a communication connection to the device 103 exists.

In the second time bar from the top, the trigger event is designed as connecting 304 a charging cable to the socket 74. Thereafter, two consecutive patterns of white light (w) are emitted. Each pattern comprises a different flashing pattern. The first flashing pattern with short white light emissions is emitted as long as the charging process of the energy storage device 85 continues. The second flashing pattern with a sustained white light emission is output when the energy storage device 85 is charged, provided that the charging cable is still in the socket 74. In the first flashing pattern, the light intensity I and/or the duration of the individual light signals can increase over time t.

In the third time bar from the top and removing 303 the key 1 from the locking device 101 as a trigger event, blue (b) can be flashed twice and red (r) once, for example. Two different items of information are represented here one after the other using different patterns that differ in color and flashing pattern.

The first pattern in blue (b) color with a "short" "short" flashing pattern is the information that a connection to the device 103 has been established. For example, when the key 1 is removed, information data about the time of the access request, about the locking device 101 and about the existing or lacking access authorization can be transmitted to the device 103 from the key 1. This allows a database of access events to be maintained.

The red (r), long light signal long as a pattern reflects an error. This indicates that the information data has not been successfully transmitted to the device. It is possible that more detailed information about the error will now be output on a screen of the device 103.

However, if the information data was transmitted without errors, the second pattern with the red, long light signal is absent.

The light emissions represented on the two lower time bars are each triggered by the trigger event of inserting 302 the key 1 into the locking device 101. In the two lower time bars, a pattern consisting of a long white (w) light signal is initially emitted. This indicates that the charge status of the energy storage device 85 falls below a limit value stored in the electronics 70.

In the second lowest time bar, two short red (r) light signals follow as a second pattern. These indicate that there is no access authorization. On the other hand, in the lowest time bar, the long white signal is followed by a medium-long green (g) signal as a second pattern that represents the existing access authorization.

If the charge status of the energy storage device 85 is above the limit value, then the first pattern is absent and only the pattern for "lacking access authorization" or "existing access authorization" is emitted.

Information about the key 1, e.g. the charge status of the energy storage device 85 or the connection to the device 103 can be represented by the light device 75. Likewise, information regarding the locking device 101, e.g. existing or lacking access authorization can be represented.

Contrasting information, e.g. an existing or lacking access authorization, are not only represented by the different colors "green" and "red", but also by the different flashing patterns "medium" or "short" short". This allows a color-blind user to distinguish between contrasting information.

For example, with the help of the device 103, e.g. an app installed on the device 103, it can be configured for which events light from the light device 75 should be emitted. Thus, it may be desirable to protect the energy storage device 85 and e.g. not to have the information about the access authorization represented by the light device 75. Such a configuration is transferred from the device 103 to the key 1 and stored in the electronics 70.

Figure 10:
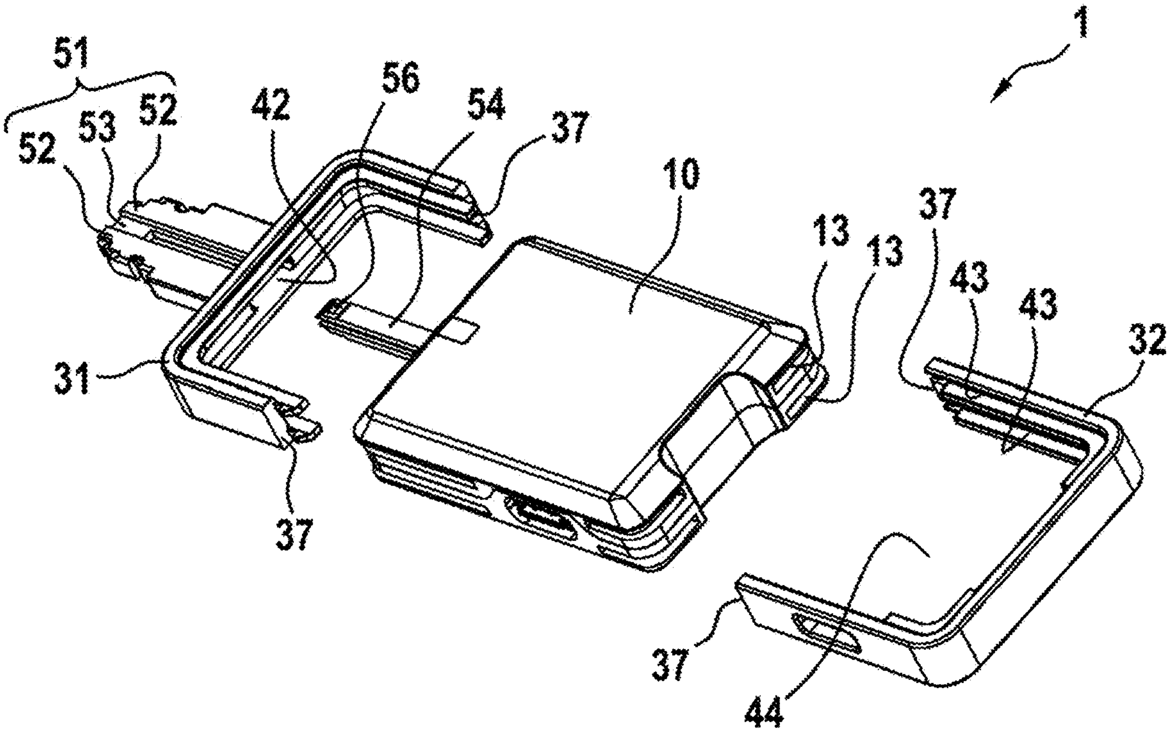

FIG. 10 illustrates a state during the assembly of the key 1 according to the disclosure. Accordingly, the two housing parts 11, 12 are first placed one on top of the other. The electronics 70, in particular also the energy storage device 85, are already located between the two housing parts 11, 12. Furthermore, the insert element 54 is inserted between the two housing parts 11, 12.

In order to press the two housing parts 11, 12 firmly onto one another and thereby in particular to compress the seal 28, the described rail holders 13 are provided in the two housing parts 11, 12, which are pushed into the associated rails 43 of the two frame parts 31, 32. The two frame parts 31, 32 can be pushed onto the housing 10 simultaneously or one after the other.

During this assembly process, the insert element 54 already connected to the housing 10 is inserted through an insert element through-opening 42 in the first frame part 31 and can thus be inserted between the two shank legs 52.

Figure 11:
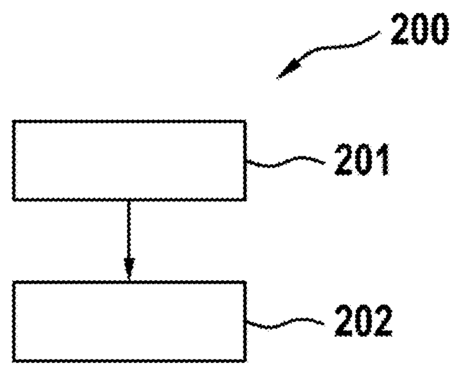

FIG. 11 illustrates an assembly method 200 for this exemplary embodiment. First, in an assembly method step a) 201, the electronics 70 and the energy storage device 85 are thereby surrounded by the housing 10. The housing 10 is then attached to the frame 30 in an assembly method step b) 202.

In assembly method step b) 202, the rail holders 13 are pushed into one another with the rails 43 and at the same time the insert element 54 is pushed into the key shank main body 51.

The invention claimed is:

1. An electromechanical locking device and a key for the electromechanical locking device,
- wherein the key comprises a key bow,
- wherein the key bow comprises a light device,
- and wherein the key bow comprises electronics which are designed to actuate the light device to reproduce at least one item of information in a luminous manner,
  - wherein the key is designed to enter into a wireless communication connection with a device, wherein the electronics are designed to display a search for the communication connection and/or an existing communication connection as information by way of the light device by actuating the light device,
  - wherein the key comprises an electrical energy storage device, wherein the electronics are designed to represent a charge status of the energy storage device as information by actuating the light device,
  - wherein the information about the energy storage device is represented in a different color than the information about the connection of the key to the device,
  - wherein the electronics are designed to represent at least as information the absence of an access authorization using the light device by actuating the light device and the electronics are designed to represent information about the connection of the key to the device in a different color than the absence of an access authorization by actuating the light device,
  - wherein if there is no electronic access authorization, then a cylinder core cannot be rotated in a housing of the locking device.

2. The electromechanical locking device and the key for the electromechanical locking device according to claim 1, wherein the light device is designed to light up in at least three colors.

3. The electromechanical locking device and the key for the electromechanical locking device according to claim 2, wherein the light device comprises at least one light element which is designed to light up in at least three colors, wherein the light element is designed as a red green blue (RGB) light emitting diode (LED).

4. The electromechanical locking device and the key for the electromechanical locking device according to claim 3 wherein the electronics are designed to display the search for the communication connection and/or the existing communication connection by way of the light element by actuating the light device.

5. The electromechanical locking device and the key for the electromechanical locking device according to claim 4, wherein the electronics are designed to represent different information about the connection of the key to the device in only one color by actuating the light device.

6. The electromechanical locking device and the key for the electromechanical locking device according to claim 1, wherein the key comprises an interface for charging the energy storage device, wherein the electronics are designed to represent a charging process and/or an end of the charging process as information by way of the light device, by actuating the light device; wherein the representation is limited to the time that the interface is in connection with a power source.

7. The electromechanical locking device and the key for the electromechanical locking device according to claim 1, wherein the electronics are designed to represent at least as information the existence of an access authorization and/or the absence of an access authorization by actuating the light device and the electronics are designed to represent information about the energy storage device in a different color than the existence of an access authorization and/or the absence of an access authorization by actuating the light device.

8. The electromechanical locking device and the key for the electromechanical locking device according to claim 1, wherein the electronics are designed to represent as information at least one of the following errors by way of the light device:
- a faulty locking device, and
- a faulty key, disrupted communication with the device.

9. The electromechanical locking device and the key for the electromechanical locking device according to claim 1, wherein the electronics are designed to actuate the light device, after a trigger event to reproduce at least one item of information in a luminous manner, wherein the trigger event is configured at least as one of the following events:

inserting the key into the locking device, removing the key from the locking device, wherein the electronics are designed to represent different colors and/or different flashing patterns and/or different light intensities triggered in succession by a single trigger event by actuating the light device, wherein the different colors and/or flashing patterns and/or light intensities represent different information about the key and/or the locking device.

10. The electromechanical locking device and the key for the electromechanical locking device according to claim 6, wherein the electronics are designed to actuate the light device to represent a charge status of the energy storage device after the key has been inserted into the locking device, wherein the representation of the charge status is information from a plurality of items of information that is represented after inserting the key.

11. The electromechanical locking device and the key for the electromechanical locking device according to claim 1, wherein the key can be configured in such manner that at least a part of the information that can be represented by the light device is not permanently represented by the light device, wherein this configuration can be stored in the electronics.

12. The electromechanical locking device and the key for the electromechanical locking device according to claim 1, wherein the key comprises a housing made of plastic, and a metal frame for the housing, wherein a light guide is arranged in the housing, wherein the light device lights up through the light guide towards a broad side of the key, and/or wherein the light device lights up beyond the frame in the direction of the key shank.

13. The electromechanical locking device and the key for the electromechanical locking device according to claim 1, comprising a key shank for insertion into the locking device, wherein the key shank is rigidly connected to the key bow, and wherein the key shank comprises at least one electrical transmission element in order to transmit electrical energy to the locking device and/or to transmit electronic data to the locking device and/or to receive electronic data from the locking device.

14. The electromechanical locking device and the key for the electromechanical locking device according to claim 1, wherein the electronics are designed to represent different information about the energy storage device in only one color by actuating the light device.

15. The electromechanical locking device and the key for the electromechanical locking device according to claim 3, wherein the electronics are designed to represent a charge status of the energy storage device as information by way of the light element by actuating the light device.

16. The electromechanical locking device and the key for the electromechanical locking device according to claim 1, wherein the electronics are designed to represent at least as information the existence of an access authorization and/or the absence of an access authorization by way of the light device by actuating the light device and the electronics are designed to represent information about the connection of the key to the device in a different color than the existence of an access authorization and/or the absence of an access authorization by actuating the light device.

17. The electromechanical locking device and the key for the electromechanical locking device according to claim 16, wherein the key is designed to represent both the information about the energy storage device and the information about the connection of the key to the device in at least one different color than the color for the absent access authorization by actuating the light device.

18. A key for an electromechanical locking device, with a key bow, wherein the key bow comprises a light device, and wherein the key bow comprises electronics which are designed to actuate the light device to reproduce at least one item of information in a luminous manner, wherein the key is designed to enter into a wireless communication connection with a device, wherein the electronics are designed to display a search for the communication connection and/or an existing communication connection as information by way of the light device by actuating the light device, wherein the key comprises an electrical energy storage device, wherein the electronics are designed to represent a charge status of the energy storage device as information by actuating the light device, wherein the information about the energy storage device is represented in a different color than the information about the connection of the key to the device, wherein the key comprises at least one electrical transmission element for transmitting electronic data to the locking device, wherein the key is configured to either immediately forward data from the device to the locking device or to store data and transmit it at a later time.

* * * * *